United States Patent [19]

Valent

[11] Patent Number: 5,616,869
[45] Date of Patent: Apr. 1, 1997

[54] ACTUATOR TORQUE NON-LINEARITY COMPENSATION FOR HARD DISK DRIVES

[75] Inventor: James A. Valent, Longmont, Colo.

[73] Assignee: Maxtor Corporation, Longmont, Colo.

[21] Appl. No.: 573,943

[22] Filed: Dec. 18, 1995

Related U.S. Application Data

[62] Division of Ser. No. 243,455, May 16, 1994, Pat. No. 5,476,015.

[51] Int. Cl.⁶ .................................................... G11B 5/00
[52] U.S. Cl. .................................. 73/862.541; 360/78.06
[58] Field of Search ........................... 73/862.08, 862.29, 73/862.322, 862.18; 360/78.09, 78.11, 75

[56] References Cited

U.S. PATENT DOCUMENTS

| | | | |
|---|---|---|---|
| 4,688,118 | 8/1987 | Knowles et al. | 360/75 |
| 4,786,990 | 11/1988 | Overton et al. | 360/75 |
| 4,937,803 | 6/1990 | Nakane | 369/32 |
| 5,119,250 | 6/1992 | Green et al. | 360/78.06 |
| 5,132,855 | 7/1992 | Waugh et al. | 360/78.07 |
| 5,233,486 | 8/1993 | Albert | 360/75 |
| 5,305,160 | 4/1994 | Funches et al. | 360/78.07 |

Primary Examiner—Richard Chilcot
Assistant Examiner—Ronald L. Biegel
Attorney, Agent, or Firm—Sheridan Ross PC

[57] ABSTRACT

The present invention involves compensating for the irregularity in the torque constant of an electric motor used to move an actuator arm carrying a magnetic read/write head in a disk drive. The torque constant of an electric motor varies across the operating range on a given drive as a function of head location. The present invention provides an apparatus and method for determining the torque constant versus position function of a given disk drive during the servo write process.

10 Claims, 8 Drawing Sheets

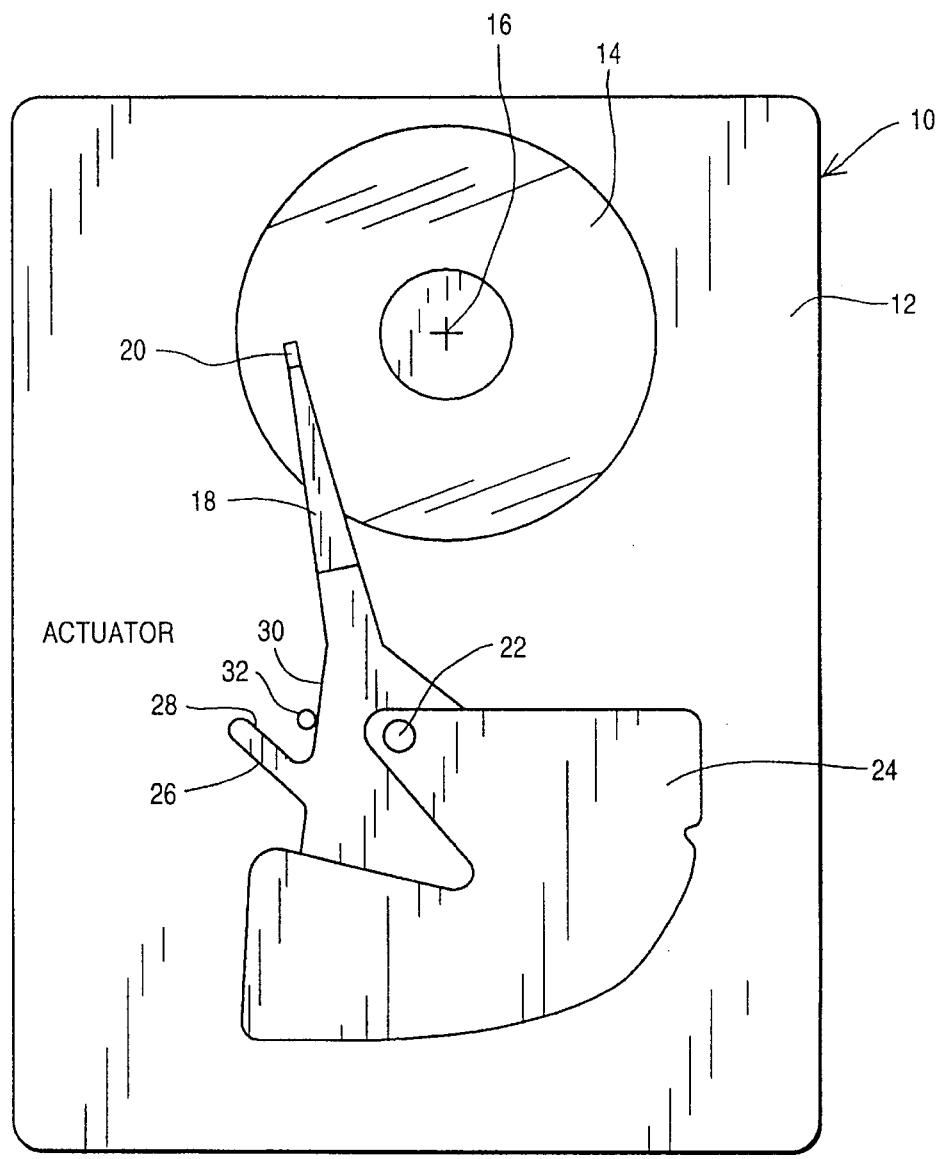
FIG_1

FIG_2
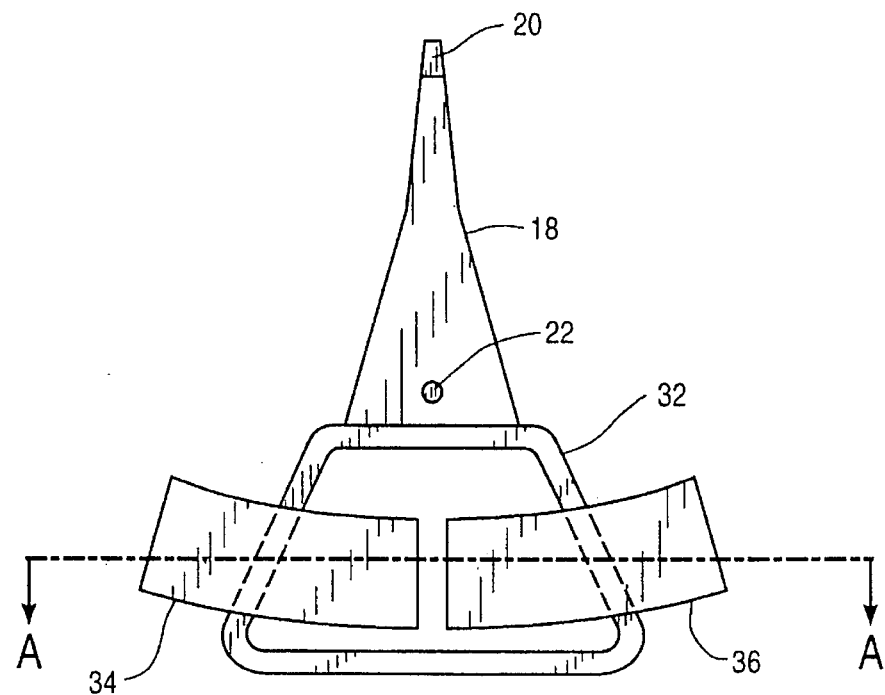
FIG_3
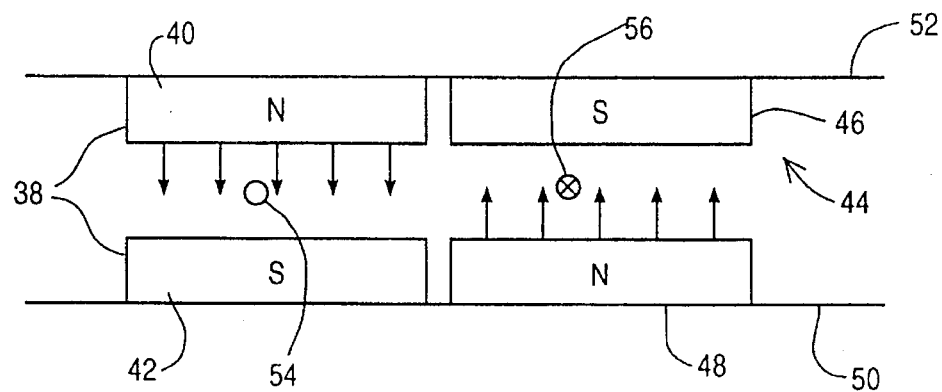

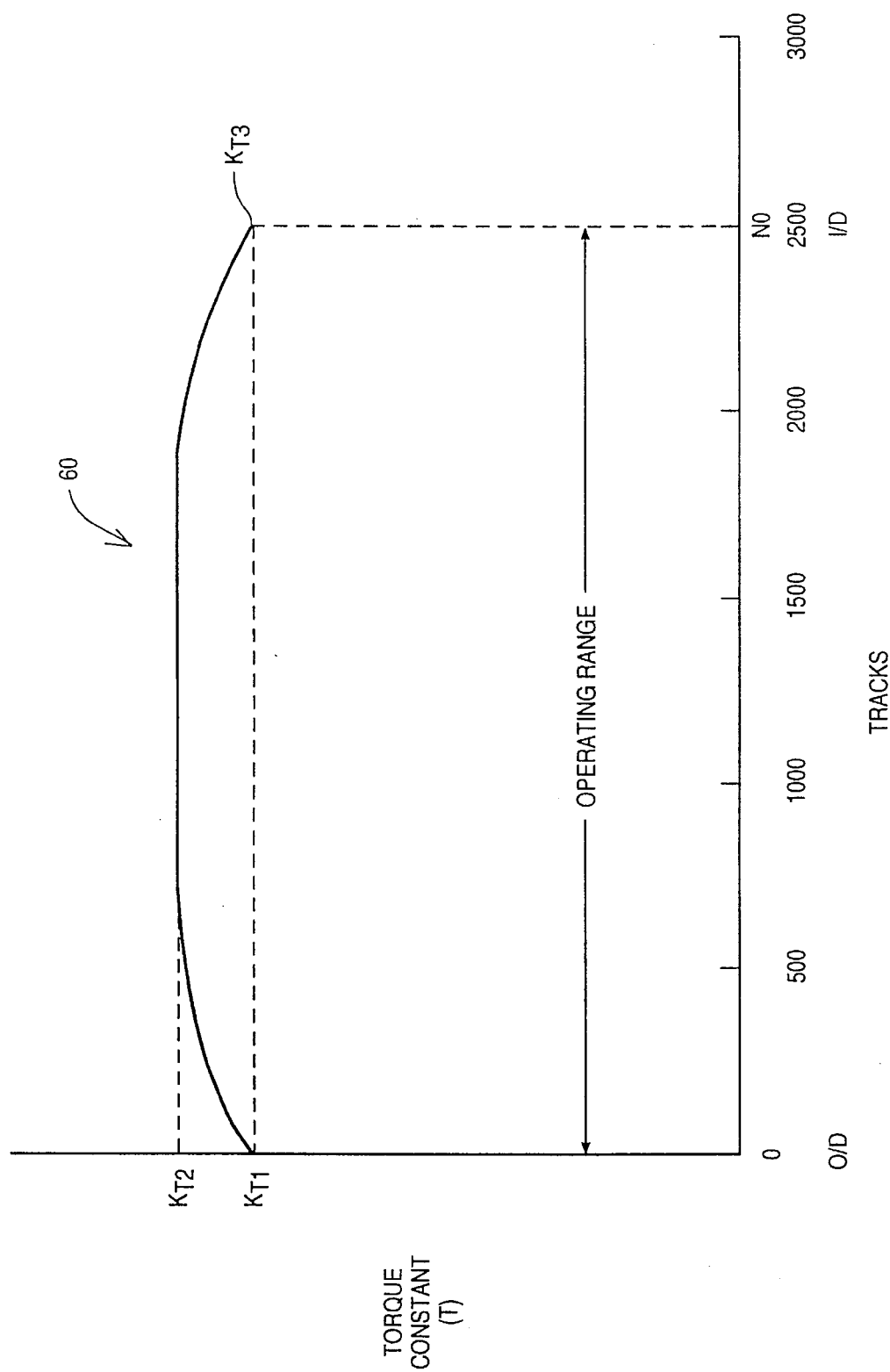
FIG_4

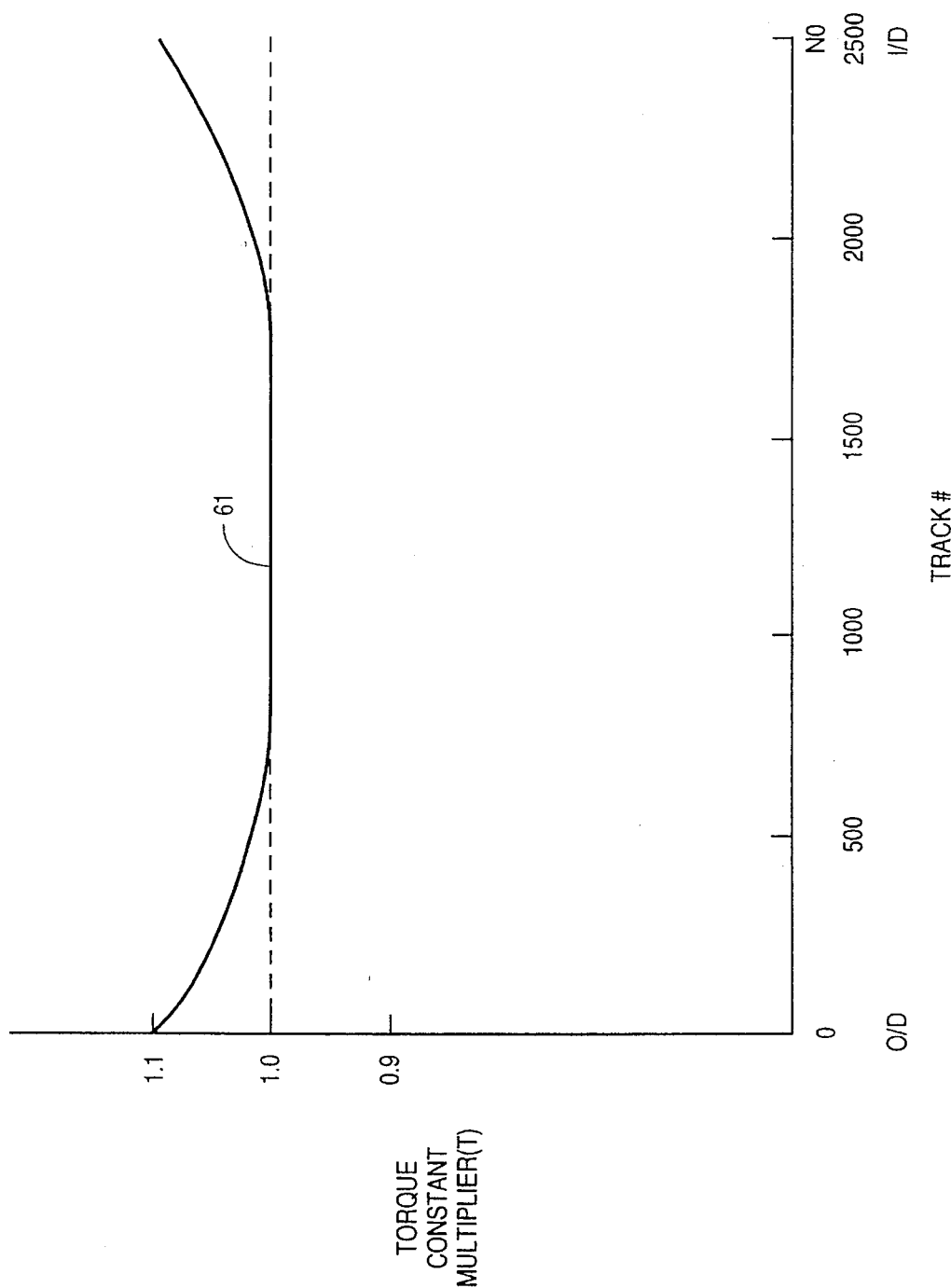

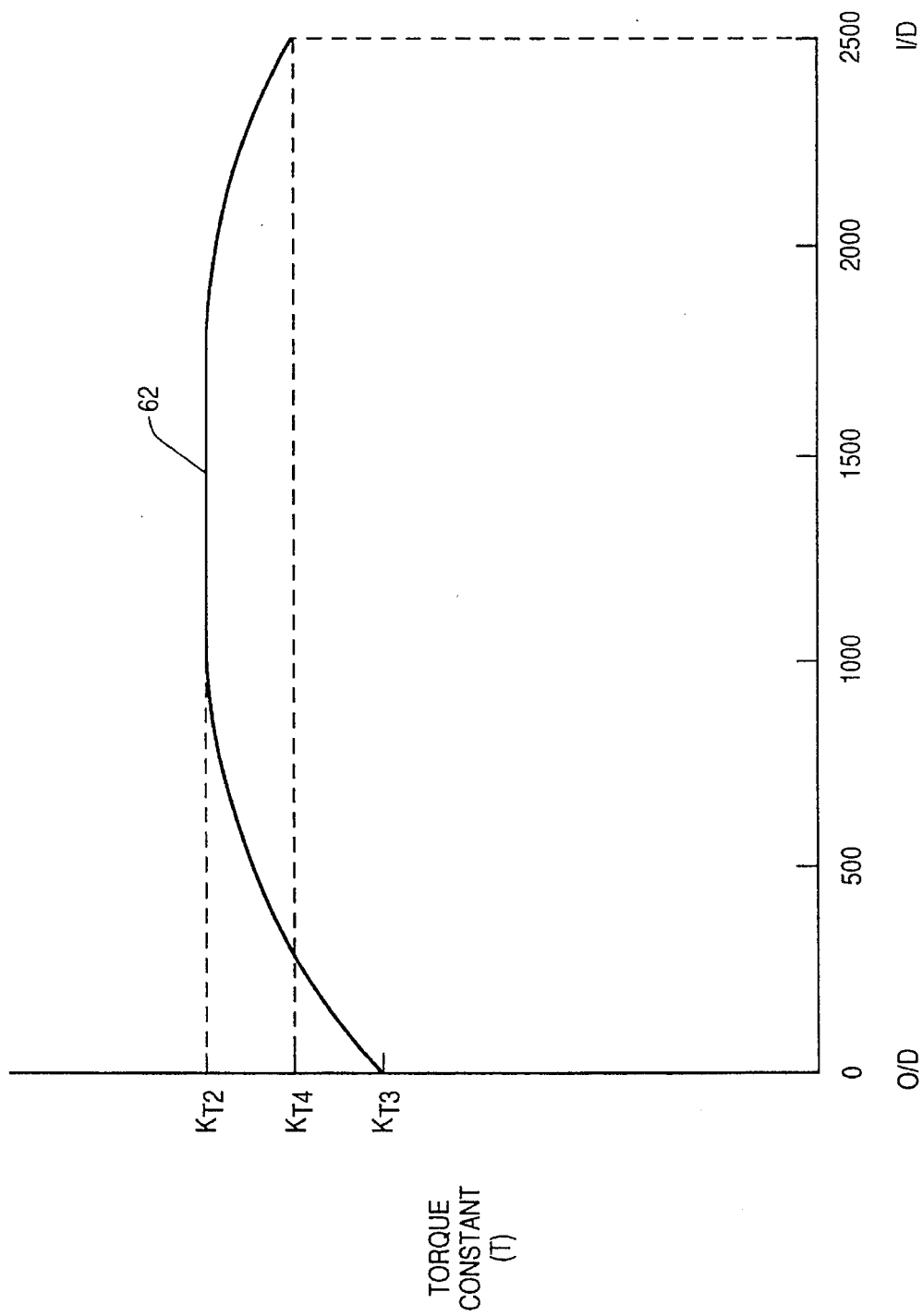
FIG_6

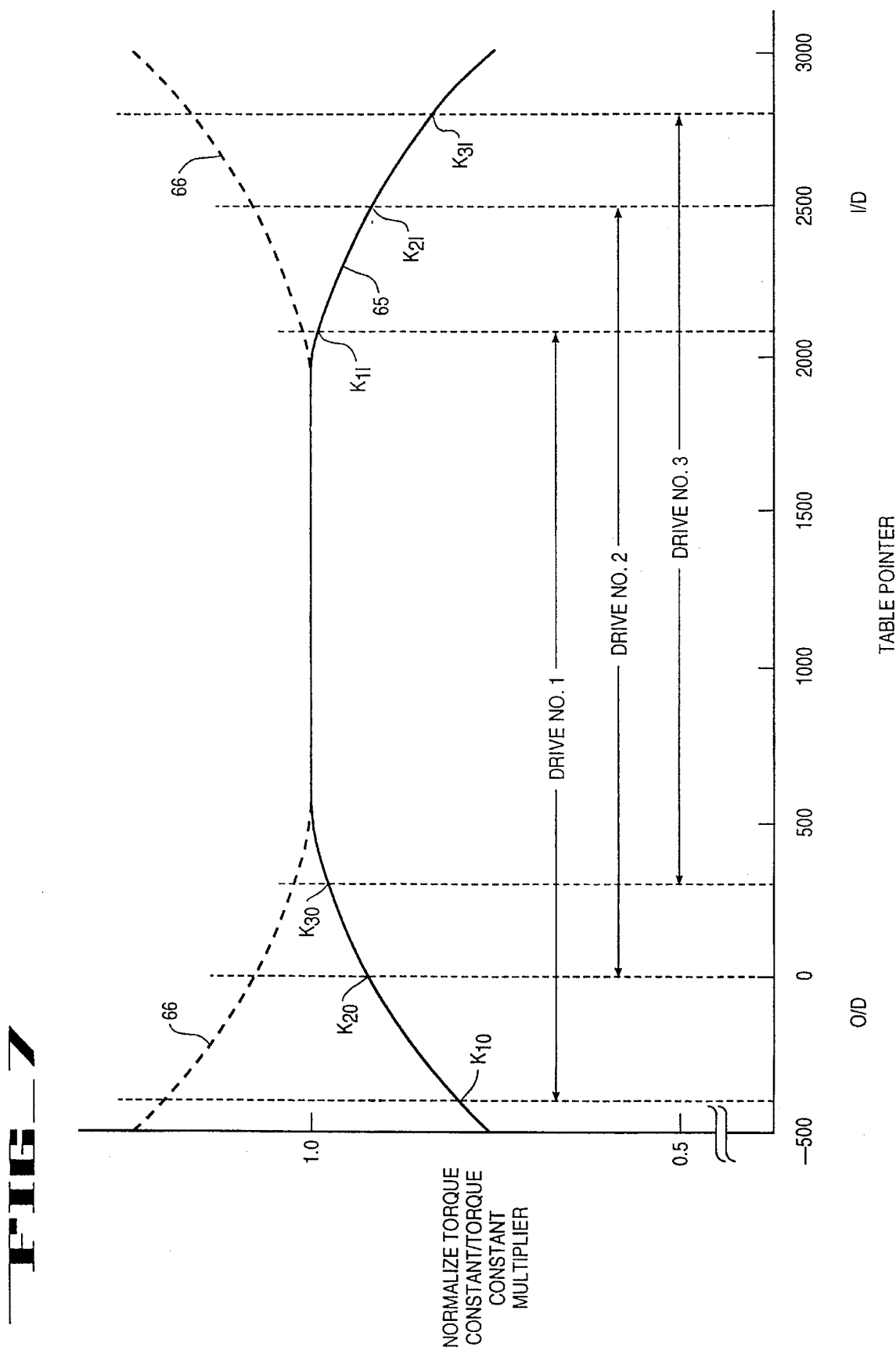

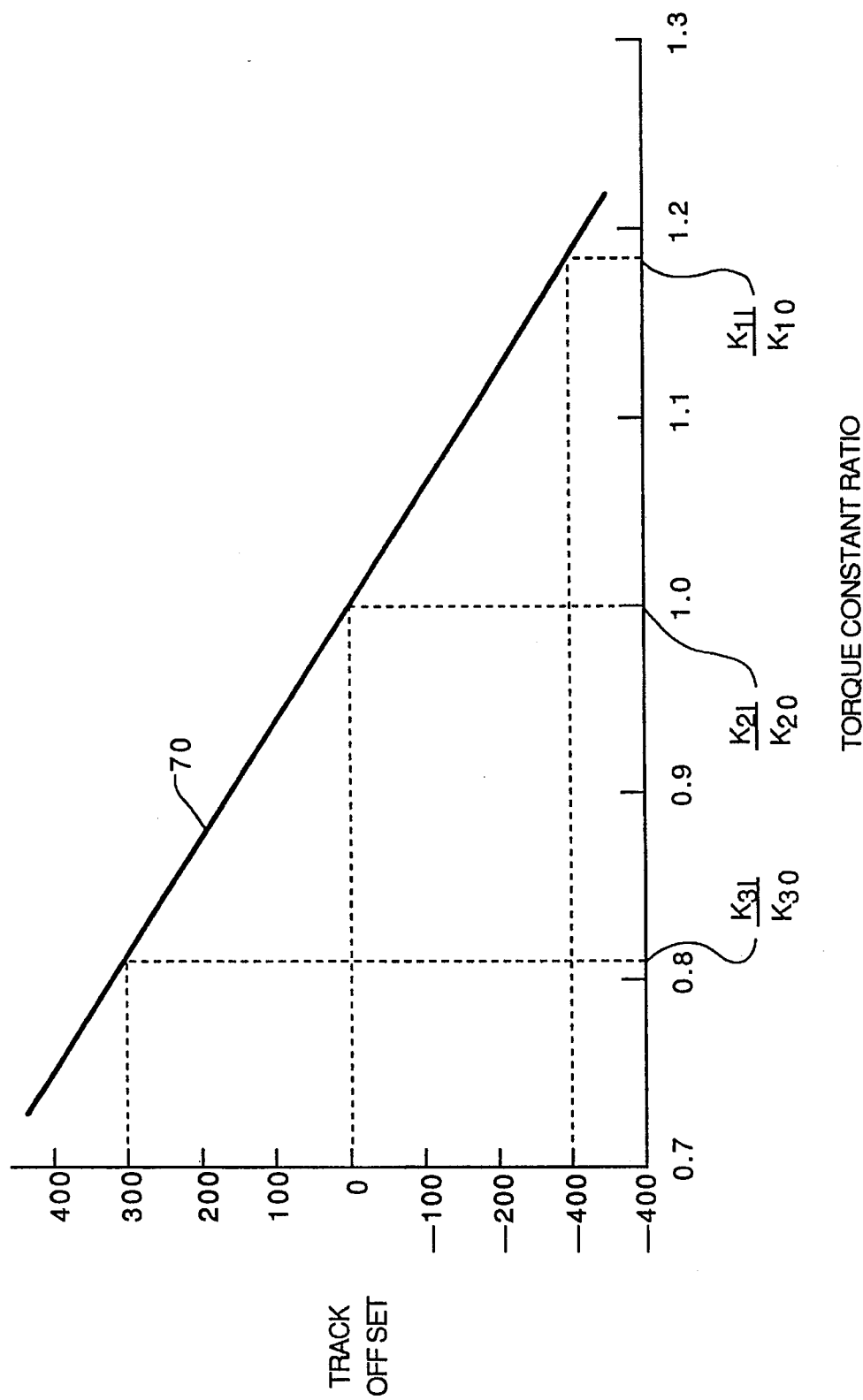

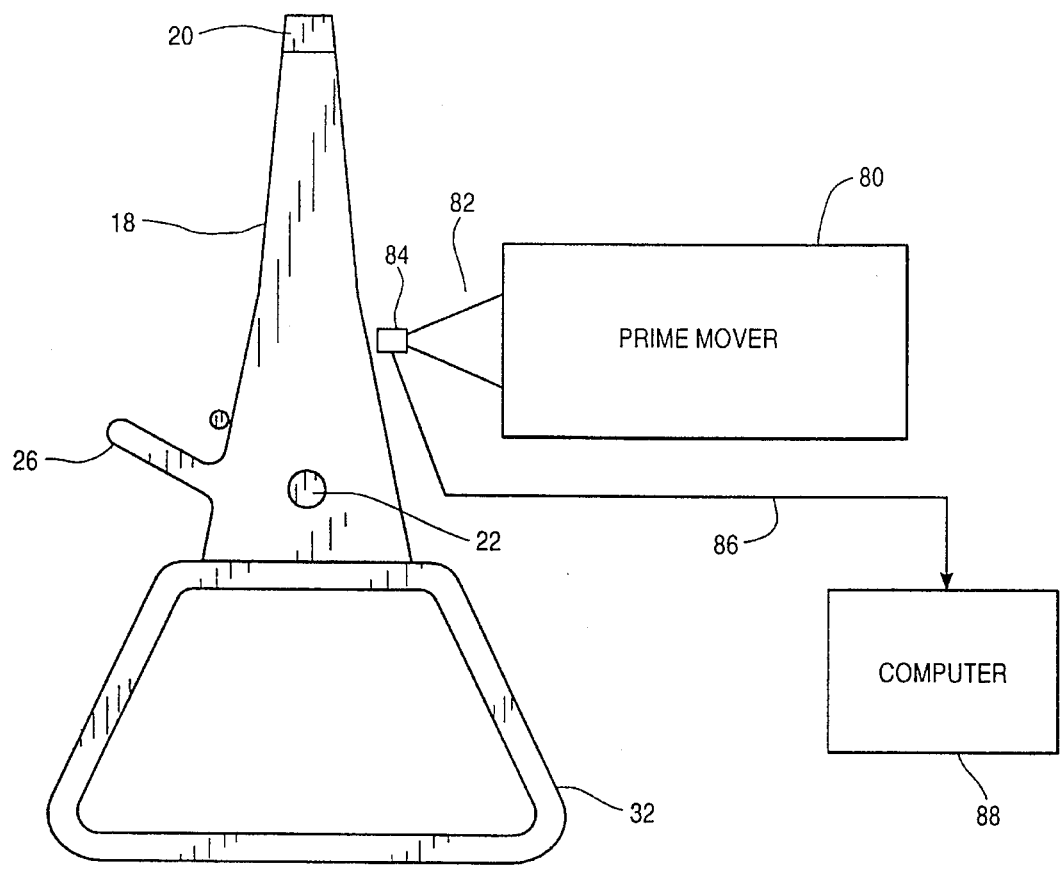
FIG_9

ACTUATOR TORQUE NON-LINEARITY COMPENSATION FOR HARD DISK DRIVES

This is a divisional of application Ser. No. 08/243,455, filed May 16, 1994, now U.S. Pat. No. 5,476,015.

BACKGROUND OF THE INVENTION

1. Field of the Invention

This invention relates to disk drive head positioning. More particularly it relates to a method and apparatus for compensating for non-linearity in the torque constant of the drive actuator motor.

2. Background

One of the most important data storage devices for digital computers is a class of devices known as hard disk drives. A hard disk drive consists of a rotating disk with magnetic media deposited on one or more surfaces in concentric information tracks. Information is stored in the magnetic media by causing magnetic domains to be in one of two polarities. The domains are switched from one polarity to another in a write operation by a transducer. The same transducer also detects the state of each domain. The transducer and its mechanical housing is referred to as a head.

Information is communicated to and from the disk by placing the head over the desired track and performing either a read or write operation. The head is positioned by a mechanical arm called the actuator. The actuator is in turn caused to move by an electric motor which is connected through a digital to analog converter and amplifier to a digital computer.

A servo control loop is used to control head positioning as the head is being moved transversely across tracks and to cause the head to remain over a particular data track as the disk spins. The servo loop controls the acceleration of the head which results from a force supplied by the electric motor on the actuator. The input to the servo system are readings of head position made by the head itself. The head position is determined from position information written directly onto the disk by a servo writer as part of the manufacturing process. The position information, also referred to as servo information, includes the track number as well as an indication of how far the recording head is from the track center line. That is, a certain number of bits of information on each track are reserved for indicating position. As the head passes over the indicators, the track over which the head is sitting is determined by the head itself and supplied to the servo system. The indicators are at regularly spaced locations. Thus the input to the servo is not continuous but is sampled.

A hard disk drive must respond to read and write requests from the host computer that requires the head to move to and hover over any track on which information has been written. In order to be effective, the drive must perform this function very quickly. The time required from the receipt of a read or write request from the host computer until the head has been positioned over the track containing the information and commenced to read the information is called the "the seek time". All disk drive manufacturers work to minimize seek time. The servo system plays a critical role in minimizing seek time.

The transfer function of the servo system at its highest level of abstraction is given by Equation 1 below.

$$\frac{OUTPUT}{INPUT} = \frac{G}{1+GH} \quad (1)$$

where G is the plant and compensator elements and H is the feedback gain. In this case, the plant includes the actuator, the head, the actuator motor and mechanical parts for moving the actuator arm. The transfer function for the actuator and mechanics (represented in Laplace transform notation) is set out in Equation 2.

$$K_t/J_a S^2 \quad (2)$$

In equation 2, $K_t$ is the torque constant of the actuator motor, $j_a$ is the inertia of the moving parts and $s^2$ is the Laplace operator. Thus, in order to have a servo control loop, the torque constant of the actuator motor must be known. The more accurately $j_a$ and $K_t$ are known, the more accurately the proper current can be called for by the servo system to move the head. This in turn reduces the position and velocity error that the head will have as it approaches the desired track and thus increases the speed of the seek operation.

FIG. 1 is a schematic of a hard disk drive as used with conventional desk top computers. Referring now to FIG. 1, disk drive 10 includes a substrate 12 onto which a rotating disk 14 is mounted around a center of rotation 16. An actuator arm 18 having a head 20 rotates around a center of rotation or pivot point 22. As actuator 18 rotates around point 22, head 20 sweeps across the face of disk 14. A magnet assembly 24 is attached to substrate 12 with a series of screws, not shown. A crash stop 26 is an integral part of actuator 18 and in cooperation with crash pin 32 determines the extreme positions to which head 20 may rotate around pivot point 22. The maximum distance through which head 20 can move as determined by crash stop 26 and crash pin 32 is called the stroke of the head. The stroke in turn determines the operating distance that head 20 can traverse. This in turn determines the total number of tracks on disk 14 that can be addressed by head 20.

FIG. 2 shows actuator 18 and a cutaway of magnet assembly 24. Referring to FIG. 2, actuator 18 rotates around actuator pivot point 22. Actuator 18 is bonded firmly to an electrical coil 32. Coil 32 is the rotor portion of a dc motor. The stator of the dc motor consists of permanent magnets shown schematically at reference numerals 34 and 36 in FIG. 2.

FIG. 3 is a cross section taken through points A—A in FIG. 2. Referring now to FIG. 3, there is a first permanent magnet 38 having its north pole at reference numeral 40 and its south pole at reference numeral 42. There is a second permanent magnet 44 which includes a south pole 46 and a north pole 48. Surfaces 50 and 52 represent the upper and lower surfaces of magnet assembly 24 in FIG. 1. The two permanent magnets 38 and 44 are typically glued to surfaces 50 and 52 in the manufacturing process. The cross section of coil 32 of FIG. 2 is shown at reference numerals 54 and 56 in FIG. 3.

Referring again to FIG. 2, the combination of coil 32 and permanent magnets 34 and 36 form a dc motor. When a dc current is impressed on coil 32, a torque, T, operating around center of rotation 22 is exerted on coil 32 and thus on actuator 18. The torque on actuator 18 is set out in Equation 3 below.

$$T = K_t I \quad (3)$$

Where $K_t$ is the torque constant and I is the current in coil 32.

FIG. 4 shows a graph of the torque constant, $K_t$, of the dc motor described above as a function of head position over disk 14 of FIG. 1. Referring now to FIG. 4, the Y-axis is the torque constant $K_t$. It is measured in In-oz per ampere. The X-axis is distance across disk 14. For purposes of describing the invention, the units of measure of distance are tracks. However, it is often measured in degrees of rotation of head 20 around actuator pivot point 22. As a matter of convention, track zero is the track closest to the outside diameter of disk 14 and is labeled O/D in FIG. 4. The highest number track number NO is the track closest to the inside diameter and is labeled I/D in FIG. 4. A disk drive uses a fixed and predetermined number of tracks, such as 2500. Crash stop 26 and crash pin 32 are designed in conjunction with the density of tracks on disk 14 to allow head 20 to traverse no more than 2500 tracks.

FIG. 4 makes it clear that the torque constant, $K_t$, is not, in fact, a constant over the entire range of motion of the head. The torque constant, $K_t$, starts at a value $K_{t1}$ at track 1 and increases to a maximum, $K_{t2}$. It remains at value $K_{t2}$ for most of the distance across the disk and then gradually decreases to value $K_{t3}$ for track 2500. A design goal is to operate the actuator such that its operating range is symmetric with respect to the torque constant non-linearity curve.

The reason that $K_t$ falls off as the head approaches either edge of the disk is best understood by an examination of FIGS. 2 and 3. From these Figures it can be seen that as head 20 approaches either extreme angular position, segments 54 and 56 of coil 32 approach the ends of permanent magnets 38 and 44. At these positions, coil 32 intersects fewer lines of magnetic flux from the permanent magnets. The force on coil 32 is correspondingly reduced and thus the torque constant is reduced. Making permanent magnets 38 and 44 larger is not a solution since users are demanding smaller not larger disk drives.

The fact that $K_t$ is not a constant over the entire stroke of actuator 18 is a problem that has been addressed in the prior art. The deviation of $K_t$ from being a constant value can be compensated for by the microprocessor controlling the disk drive. This is accomplished by developing a look up table, called a torque constant multiplier table, and placing it in the memory of the microprocessor that controls the disk drive. The table provides a torque constant multiplier for each track from track 0 to N0. FIG. 5 is a graphic illustration of the torque constant multiplier table. In FIG. 5, the X-axis is track number and the Y-axis is torque constant multiplier. Referring now to FIG. 5, curve 61 has a basic shape that is the inverse of torque constant curve 60 of FIG. 4. The values in the torque constant multiplier table are unity (1.0) in the mid-region where the torque constant is substantially constant and the multiplier increases at the stroke endpoints where the actuator torque constant magnitude decreases.

In operation, when a seek request is received from the host computer, the microprocessor in the disk drive accesses the torque constant multiplier table based upon the track number over which the head is positioned as determined from the servo information encoded on each track. As the actuator moves the heads across the surface of the disk, the microprocessor compensates for the actuator's non constant torque constant by reading a value from the torque constant multiplier table. The value from the torque constant multiplier table is used to adjust the amount of current supplied to the actuator. The result is a drive with actuator dynamics which closely resemble an ideal system in which the actuator torque constant is flat throughout the stroke. During a seek, each time a different track number is read by the head, indicating a new actuator location, a new value is read from the torque constant multiplier table and the actuator current is modified accordingly.

In addition, when the disk drive is initially powered on, the microprocessor performs a mid stroke calibration to additionally compensate for any torque constant magnitude variation from nominal that may be present in that particular disk drive.

However a problem arises because of the mechanical tolerances of the manufacturing process. Of particular relevance in the manufacturing process are the steps of gluing the permanent magnets to the magnet assembly, drilling holes in the magnet assembly and into the disk drive substrate and drilling the crash pin hole. There are mechanical tolerances associated with each of these steps. That is, the magnets will be glued and the holes drilled in slightly different places for each drive as it is manufactured. These tolerances are such that the stroke of actuator 18, while remaining a constant 2500 tracks, cause coil 32 to reach different extreme positions with respect to permanent magnets 38 and 44 for each drive. The results of this variation can best be understood by reference to FIG. 6.

The axes of FIG. 6 are the same as FIG. 4. Curve 62 is a graph of the actual variation of torque constant, $K_t$, as a function of head position for a drive that has been assembled such that the end point of movement of coil 32 with respect to permanent magnets 38 and 44 is quite different from that for the drive represented in FIG. 4. In FIG. 6, the symmetry of the curve with respect to mid stroke is no longer present. The peak value of $K_t$ at mid stroke, $K_{t2}$, in FIGS. 4 and 6, is not necessarily the same magnitude in both curves. Any differences in the peak value of torque constant, $K_{t2}$, is compensated for by the mid stroke calibration performed after the drive is initially powered on. If the torque constant multiplier table resident in the microprocessor memory were that as shown in FIG. 5, seek time performance would not be optimum since the torque multiplier table does not match the actuator torque constant profile for the drive under consideration.

Thus it can be seen that the variations in the mechanical assembly of a drive can cause significant errors in the torque constant multiplier table. So, even with a torque constant multiplier table in memory, the servo loop may not receive an accurate number for torque constant multiplier for tracks close to the beginning or end of the operating range.

OBJECTS OF THE INVENTIONS

It is therefore an object of the present invention to compensate for drives having different physical operating ranges by determining where each drive operates relative to a nominal operating range and accessing the torque constant multiplier table at a track address that adjusts for any offset between the actual and nominal operating range.

It is another object of the present invention to provide a method for accurately determining the torque constant multiplier versus position function of a disk drive.

It is another object of the invention to provide a method for compensating for a torque constant in a disk drive actuator motor that varies randomly as a function of the manufacturing process.

It is yet another object of the invention to provide a method and apparatus for determining the torque constant multiplier versus location on the disk relationship after a disk drive has been assembled.

It is an object of the invention to provide a method for directly calculating the torque constant multiplier at any point in the actuator operating range.

SUMMARY OF THE INVENTION

These and other objects of the invention may be achieved with an improved method for use in a hard disk drive where the drive includes an electric motor used to move an actuator arm which carries a magnetic read/write head any distance across a rotating disk within a mechanically defined operating range and where the torque constant of the electric motor varies across the operating range on a given drive as a function of head location and the operating range varies from drive to drive due to variations in the manufacturing process for the drive, and where the location of the head with respect to magnetic tracks written onto the disk is determined by reading the servo information from the tracks, and where the variation in torque constant may be compensated for with a torque constant multiplier.

The method begins with the step of creating a first table that relates a torque constant multiplier of the motor with the location of the head over the disk for substantially all head locations over the disk possible with the manufacturing process;

The next step includes defining a nominal operating range of head locations within the first table;

The next step includes creating a second table that relates a measurable parameter on each disk drive to the relative location of each disk drive's operating range to the nominal operating range. One such parameter is the ratio of torque constants at two head locations over the possible actuator operating range to a head location offset from the nominal operating range.

The next step includes measuring a parameter directly related to a first and second torque constant at first and second head locations on the disk drive under consideration and calculating the ratio of the parameters at the first and second head locations.

The next step includes determining the head location offset of the operating range of the disk drive under consideration from the nominal operating range from the second table;

The next step includes modifying the head location, as determined by reading the servo information, with the offset to form an offset head location;

Finally, the method includes obtaining the value of the torque constant multiplier associated with the offset head location from the first table.

Preferably the first track is track 0 in the mechanically determined operating range and the second tack is the highest numbered track in the mechanically determined operating range, and the nominal operating range is in the symmetric region.

The head position may be measured in degrees of angle around a pivot point of the actuator or in tracks.

The step of measuring the ratio of the torque constants at a first and second locations comprises causing a predetermined current to be delivered to the electric motor and measuring the distance that head moves for a predetermined fixed time interval at both the first and second locations. The distance is measured by reading the track and position data in the servo information on the disk. The ratio of the distances moved at the second location to the first location is equal to the ratio of the torque constants at the second location to the torque constant at the first location.

A method of creating the first table comprises: measuring the torque constant as a function of head location of a statically significant number of actuator assemblies over a range that extends beyond the nominal operating range. A single representative torque constant as a function of head location curve is created by normalizing the torque constant data for each of the individual actuators that were characterized, finding the axis of symmetry with respect to the track axis for each of the actuator assemblies that were characterized, aligning all the individual axes of symmetry, and then averaging the normalized torque constant values at each track location. The first table is the inverse of the normalized torque values at each track location.

The second table may be created by determining a sample of possible operating ranges from the single representative torque constant curve, calculating the ratio of the torque constant for two head positions for each operating range in the sample, determining the head position offset from the nominal operating range for each of the operating ranges in the sample, and matching the offset with the ratio to form a torque constant ratio vs head position offset table.

BRIEF DESCRIPTION OF THE DRAWINGS

The invention will now be described in conjunction with the Drawing wherein:

FIG. 1 is a top view of a typical hard disk drive.

FIG. 2 is the top view of FIG. 1 but including a cut away portion showing the dc motor attached to the actuator arm.

FIG. 3 is a section taken through A—A of FIG. 2 and more clearly shows the arrangement of the motor stator and rotor.

FIG. 4 is a graph of the torque constant of the dc motor that moves the actuator as a function of the location of the head for a disk drive-as used in prior art drives.

FIG. 5 is a graph of the torque constant multiplier used in the prior art.

FIG. 6 is a graph of the torque constant of the dc motor that moves the actuator as a function of the location of the head for a disk drive that has been assembled such that the mechanical tolerances in the manufacturing process causes the torque constant for the drive to be different from that set out in the prior art teaching.

FIG. 7 is a graph of wide torque constant data and wide torque constant multiplier table as used in the present invention.

FIG. 8 is a graph of track offset as a function of torque constant ratio.

FIG. 9 is schematic top view of an apparatus for measuring torque constant directly at each track during servo write.

DETAILED DESCRIPTION OF THE PREFERRED EMBODIMENT

The method of the present invention solves the problem of having drives with different operating ranges by determining where each drive operates relative to a nominal operating range and compensating for any differences.

The first step is to create a wide torque constant multiplier table for all possible locations that the head may reach over the disk assuming the greatest possible cumulative tolerance error. This is a table that is wider than the operating range of any individual drive and therefore wider than the torque constant multiplier table used in prior art drives. A single normalized torque constant curve may be generated from data taken from a statistically significant number of different actuator assemblies made with the same manufacturing process. This is referred to as a wide torque constant curve and is created by normalizing the torque constant data for each of the individual actuators that were characterized ($K_t$=1.0 at mid stroke), finding the axis of symmetry with respect to the track axis for each of the actuator assemblies that were characterized, aligning all the individual axes of symmetry, and averaging the normalized torque constant values at each track location. Typically this might be 50 actuator assemblies. The inverse of the normalized torque constant curve is determined to get the data points underlying the torque constant multiplier curve and torque constant multiplier table. The wide torque constant multiplier table is created and entered into the microprocessor memory.

FIG. 7 is a graph of wide normalized torque constant data and corresponding torque constant multiplier data. The axes of FIG. 7 are somewhat different from the axes of FIG. 4 and 6. The Y-axis of FIG. 7 has been normalized and expanded for clarity, and the X-axis is expanded to cover the equivalent of more tracks than the nominal operating range of an individual drive; the X-axis is labeled "table pointer" in order to differentiate it from tracks although the values have a similar meaning.

In FIG. 7, the wide torque constant curve is indicated by reference numeral 65. The torque constant multiplier curve indicated by reference numeral 66 is simply the inverse of curve 65. Curves 65 and 66 are coincident at a value of 1.0 over their center portion. The torque constant multiplier table is a tabular form of the data underlying curve 66.

The operating range, which is the stroke of actuator arm 18 of FIG. 1, is shown for 3 possible disk drives coming out of the same manufacturing process. The operating range that is symmetrical around the center point of curve 65 is designated as the nominal operating range. In FIG. 7, drive 2 is a nominal drive in that its operating range is nominal. The table pointer that is labeled 0 on the X-axis of FIG. 7 is the starting track (track 0) on the outside diameter for the nominal drive. There are several hundred possible tracks on either side of the nominal operating range of the nominal drive. The torque constant at table pointer 0 is $K_{2o}$ (o refers to outside diameter and 2 refers to drive 2) and the torque constant at table pointer 2500 is $K_{2i}$ (where i refers to inside diameter).

Disk drive 1 was assembled with the same manufacturing process as disk drive 2, but due to the mechanical tolerances of the manufacturing process the crash stop and/or the magnetic assembly are located in slightly different places with respect to substrate 12. The operating range of disk drive 1 goes from table pointer −400 to table pointer 2100. These pointers correspond to track 0 and track 2500 as read from the servo information on the disk. Again between table pointer −400 and 2100, there are 2500 tracks. The torque constant at table pointer −400 is $K_{1o}$ and the torque constant at table pointer 2100 is $K_{1i}$. The net effect is that the track numbers as read by the head of disk drive number 1 are offset by −400 with respect to the nominal drive.

The third hypothetical disk drive labeled disk drive 3 in FIG. 7 has an operating range that goes from table pointer +300 to 2800. The torque constant at table pointer +300 is $K_{3o}$ and the torque constant at table pointer 2800 is $K_{3i}$. In this case, the track numbers as read by the head of disk drive 3 are offset by +300 with respect to the nominal drive.

To measure the torque constant at any point on the drive, the head is moved to the track for which the torque is to be measured and stopped. Next a known constant current is impressed on coil 32 which causes actuator 18 to accelerate from a 0 velocity. After a predetermined fixed time has elapsed, the microprocessor that controls the drive records the distance head 20 has traveled via data read from the servo information encoded on the tracks. The acceleration is calculated pursuant to equation 4 following:

$$a = \frac{d^2s}{dt^2} = \frac{2S}{T^2} \quad (4)$$

where
 s=distance the head has traversed
 t=time taken to traverse a distance
 a=acceleration of the actuator and head assembly
 S=distance the head moved as measured by the microprocessor.
 T=fixed time interval of measurement Acceleration is directly related to the torque constant according to equation 5 following:

$$a = \frac{K_t * I}{J} \quad (5)$$

where
 $K_t$ =torque constant
 J=inertia of actuator assembly
 I=magnitude of constant current supplied to actuator coil The next step is to calibrate each individual drive by determining its operating range on the wide torque constant table. This is done at power on.

To calibrate each disk drive coming from the production process, a parameter is developed that relates the operating range of each disk drive with the nominal operating range of FIG. 7. While other parameters may be practical, the preferred embodiment uses the ratio of the torque constant on any given disk drive at two spaced apart head locations on the disk or the ratio of a parameter equal to torque constant ratio at two spaced apart head locations. The two spaced apart locations are preferably, but not necessarily, track 0 and track 2500; that is, the outside diameter and the inside diameter of the operating range for that particular disk drive.

To facilitate the calibration procedure, a table relating the ratio of torque constants to the location of its operating range relative to the nominal operating range is developed. A curve representing such a table is shown in FIG. 8. Referring now to FIG. 8, the units on the Y-axis are track offset. Track offset refers to the number of tracks in FIG. 7 that the operating range of a particular drive is offset from the nominal operating range. The units on the X-axis are torque constant ratio.

A method of generating the offset table involves the use of the wide torque constant table or curve. The ratio of the torque constant of the first track to the torque constant of the last track for a series of operating ranges is plotted against the offset of the operating range from the nominal operating range. For example, using the graph of FIG. 7, consider drive 1 as the first in the series of drives used for purposes of generating the curve of FIG. 8. The ratio of the torque constant at table pointer 2100 to the torque constant at table pointer −400 is calculated. The Y-axis offset for this ratio is −400. On the coordinates of FIG. 8 a point is plotted that is −400 on the Y-axis and $K_{1i}$ divided by $K_{1o}$ on the X-axis. Using the same method as described for drive 2 for drive 1, on the coordinates of FIG. 8 a point is plotted that is 0 on the Y-axis and $K_{2i}$ divided by $K_{2o}$ on the X-axis. For drive 3, the coordinates are +300 on the Y-axis and $K_{3i}$ divided by $K_{3o}$ on the X-axis. Similar points are plotted from operating ranges covering different portions of curve 65 of FIG. 7.

In operation, the torque constant multiplier table and the torque ratio-offset table are resident in the memory of the microprocessor that controls the disk drive. When a particular disk drive is powered on, it goes through a calibration routine that is controlled by the microprocessor. The present invention requires that an additional calibration be performed. The new calibration is to move the head and actuator to a first location near the outside diameter of the disk. The microprocessor will then cause a known constant current to be applied to the actuator coil to drive the head assembly towards the inside diameter for a known, predetermined time. The distance traveled from the first location during the predetermined acceleration time is measured by the head as it detects its location from the servo information encoded on the tracks. This distance recorded by the microprocessor. The heads are then moved to a second location near the inside diameter of the disk. The microprocessor then commands that same known constant current (except for sign) be applied to the actuator coil such that the head is driven towards the outside diameter for the same predetermined time that was used in the first location. The distance moved by the head at the second location is recorded by the microprocessor. The microprocessor then calculates a torque constant ratio by dividing the distance traveled at the second location by the distance traveled at the first location. From the table underlying curve 70, the offset for this particular drive is determined and stored in the microprocessor.

Each time a seek request is received by a drive from the host computer, the torque constant multiplier is retrieved from the torque constant multiplier table corresponding to the track over which the head is located as determined from the servo information on the disk. This is done by first modifying the actual head location by the track offset constant loaded at the time that the drive is calibrated. That is, the torque constant multiplier is retrieved from the torque constant multiplier table by adding the track to the offset value and generating a table pointer which "points" to the correct torque constant multiplier value.

Consider disk drive 3 of FIG. 7 as an example. At calibration time, the torque constant is measured at track 0 and at track 2500 and the torque constant ratio is calculated. As shown in FIG. 8, this ratio is approximately 0.82. From the graph of FIG. 8 or the offset table underlying the graph, the track offset is determined. In this case, the offset is +300.

Then in operation, assume the actuator/head assembly is presently located at track 100 and that the disk drive has received a request from the host to access track 200. Since the seek started at track 100, the drive microprocessor first adds the offset, 300, to the track, 100, and then finds the torque constant multiplier for table pointer 400 from the wide torque constant multiplier table. The microprocessor commands that a proper current, modulated by the torque constant multiplier, be supplied to the actuator coil in such a polarity and magnitude to drive the heads towards track 200. As the heads move, track location is read from the servo information. At each new track location read during the seek, the offset is added to the track and the torque constant multiplier is retrieved for the torque constant multiplier table; the current supplied to the actuator is modulated accordingly. This process continues until the heads have reached track 200.

FIG. 9 illustrates yet another aspect of the invention. Common reference numerals in FIGS. 1, 2 and 9 refer to the same elements. In addition to the mechanical components shown in FIG. 1, there is shown a prime mover 80 which includes a push pin 82 and a strain gauge 84. Strain gauge 84 is connected through lead 86 to computer 88.

When a disk is initially assembled into a drive, the disk is blank. There are no tracks on the disk. Writing tracks on the disk is the function of a piece of equipment called a servo writer. The servo writer supplies power to the spindle motor, moves the actuator and head very precisely across the raw disk and writes track address and fine servo information at several specified locations called sectors for each track. Prime mover 80 is the component of the servo writer that precisely moves actuator 18 and head 20. In order to snug actuator 18 up against push pin 82, a small bias current is applied to coil 32 in a direction to oppose the movement of push pin 82. A good value of bias current is 100 milliamps. This insures precision in locating head 20 in the servo track writing process.

This aspect of the present invention takes advantage of the servo writer setup to create a custom torque table for each drive as it goes through the servo write process. This is made possible by recognizing the relationship set out in Equation 4 following:

$$T=Fr \tag{6}$$

$$T=K_t * I \tag{7}$$

$$K_t=FR/I \tag{8}$$

Where
I=current
T=torque
r=radius form the pivot point 22 to push pin 82
F=force
$K_t$=torque constant In the foregoing equations, I and r are constants. Thus, torque constant, $K_t$, can be measured directly. This is done with strain gauge 84. The measurements are made at servo write time. Each time the servo writer writes a track, the torque constant is measured at that track and stored in the torque constant table in the memory of the servo writer controller. Thus each drive has a customized torque constant table. The precision of strain gauge 84 need not be exceedingly great since a relative torque table may be used. Since the values in a relative table are ratios (torque values divided by torque value at mid stroke) the absolute value of $K_T$ as measured by this method is not important. The torque constant table is then inverted to get the torque constant multiplier table. The torque constant multiplier table can be stored either on the disk of the drive being servo written or in some electronically programmed memory on the disk drive.

It will be appreciated from the foregoing that the preferred embodiment is subject to numerous adaptations and modifications without departing from the scope of the invention. Therefore, it is to be understood that, within the scope of the appended claims, invention may be practiced other than as specifically described herein.

What is claimed is:

1. An apparatus for measuring the torque constant of an electric motor that is incorporated into a hard disk drive and used to move an actuator arm which carries a magnetic read/write head in an arc across a rotating disk within a mechanically defined operating range, wherein the torque constant of the electric motor varies across the operating range on a given drive as a function of the location of the magnetic read/write head over the disk, and the operating range varies from drive to drive due to variations in the manufacturing process of the drives, said apparatus capable of measuring the torque constant when servo information is initially written on to the disk, said apparatus comprising:

positioning means for guiding the magnetic read/write head across a rotating disk, said positioning means including a movable member; and force measuring means mechanically mounted on said movable member and capable of contacting the actuator arm during operation, said force measuring means further capable of providing an electrical signal proportional to the force exerted by the actuator arm on said force measuring means during operation;

means, connected to said electric motor, for supplying a substantially constant current to the electrical motor to cause the actuator arm to contact said force measuring means during operation; and means, electrically connected to said force measuring means, for receiving the electrical signal from said force measuring means and information representative of the value of said constant current and calculating the torque constant of the motor for at least one point in the operating range of the magnetic read/write head.

2. The apparatus of claim 1 wherein said positioning means is a servo writer apparatus.

3. The apparatus of claim 1 wherein said force measuring means is a strain gauge.

4. The apparatus of claim 1 wherein said substantially constant current is approximately 100 millliamperes.

5. In a hard disk drive that includes an electric motor used to move an actuator arm which carries a magnetic read/write head across a rotating disk within a mechanically defined operating range, wherein the torque constant of the electric motor varies across the operating range on a given drive as a function of the location of the magnetic read/write head over the disk, and wherein the operating range varies from drive to drive due to variations in the manufacturing process of the drives, a method of determining the torque constant for any location of the magnetic read/write head within the operating range when servo information is written on to a disk by a servo writer, said method comprising the steps of:

applying a known current to the motor to cause the actuator arm to contact a strain gauge;

moving the magnetic read/write head across the disk;

receiving an electrical signal from the strain gauge that is proportional to the force exerted by the actuator arm on the strain gauge as the magnetic read/write head is moved across the disk; and determining the torque constant of the motor for at least one point in the operating range of the magnetic read/write head from the electrical signal and the known current.

6. The method of claim 5 wherein:

said step of determining the torque constant includes determining the torque constant at each point servo information is written on to the disk.

7. The method of claim 5 further comprising the step of:

storing each torque constant determined as a function of the location of the magnetic read/write head over the disk.

8. The method of claim 5 further comprising the step of:

determining the torque constant multiplier by inverting the value of each torque constant determined.

9. The method of claim 8 further comprising the step of:

storing each torque constant multiplier determined as a function of the location of the magnetic read/write head over the disk.

10. The method of claim 5 wherein said known current is a substantially constant current.

* * * * *